(12) United States Patent
Ishimoto (10) Patent No.: US 11,790,428 B2
(45) Date of Patent: Oct. 17, 2023

(54) INFORMATION PROCESSING DEVICE AND PROGRAM

(71) Applicant: IO INC., Tokyo (JP)

(72) Inventor: Mitsuaki Ishimoto, Tokyo (JP)

(73) Assignee: IO INC.

( * ) Notice: Subject to any disclaimer, the term of this patent is extended or adjusted under 35 U.S.C. 154(b) by 0 days.

(21) Appl. No.: 17/791,078

(22) PCT Filed: Sep. 25, 2020

(86) PCT No.: PCT/JP2020/036335
§ 371 (c)(1),
(2) Date: Jul. 6, 2022

(87) PCT Pub. No.: WO2021/205679
PCT Pub. Date: Oct. 14, 2021

(65) Prior Publication Data
US 2023/0025846 A1 Jan. 26, 2023

(30) Foreign Application Priority Data
Apr. 9, 2020 (JP) ................. 2020-070662

(51) Int. Cl.
*G06Q 30/00* (2023.01)
*G06Q 30/0601* (2023.01)
(52) U.S. Cl.
CPC ..... *G06Q 30/0629* (2013.01); *G06Q 30/0631* (2013.01)
(58) Field of Classification Search
None
See application file for complete search history.

(56) References Cited

U.S. PATENT DOCUMENTS 9,589,032 B1 * 3/2017 Brinck .............. G06F 16/90324
2001/0053998 A1 12/2001 Kohda et al.
(Continued)

FOREIGN PATENT DOCUMENTS

JP 2001-297254 A 10/2001
JP 2002-007834 A 1/2002
(Continued)

OTHER PUBLICATIONS

Notice of Reasons for Refusal issued in Japanese Patent Application No. 2020-070662, dated May 7, 2020 (8 pages).
(Continued)

*Primary Examiner* — Mila Airapetian
(74) *Attorney, Agent, or Firm* — Harness, Dickey & Pierce, P.L.C.

(57) ABSTRACT

An information processing device and a program are provided that enable a purchaser to compare provision conditions, such as the sales price of a product, in purchasing the product. The information processing device is provided with: a reception unit; a prediction unit; a specification unit; and an information generation unit. The reception unit is configured to receive a character or a character string, and input destination identification information. The input destination identification information makes it possible to identify an input destination of a character or a character string. The prediction unit is configured to predict, in accordance with the input destination information received by the reception unit, a word based on the character or character string received by the reception unit. The specification unit is configured to specify products or services related to the word. The information generation unit is configured to generate display information that displays the names of products or services as candidates of input character strings.

10 Claims, 10 Drawing Sheets

(56) References Cited

U.S. PATENT DOCUMENTS

| 2014/0280016 A1* | 9/2014 | Williams | G06F 16/3322 |
| | | | 707/710 |
| 2016/0140213 A1* | 5/2016 | Kasai | G06F 16/3323 |
| | | | 705/26.61 |
| 2017/0255278 A1* | 9/2017 | Aley | G06F 3/0482 |
| 2017/0277770 A1* | 9/2017 | Singh | G06F 16/3322 |

FOREIGN PATENT DOCUMENTS

| JP | 2002-108879 A | 4/2002 |
| JP | 2015-162181 A | 9/2015 |

OTHER PUBLICATIONS

International Search Report (English and Japanese) issued in PCT/JP2020/036335, dated Oct. 27, 2020; ISA/JP (5 pages).

* cited by examiner

INFORMATION PROCESSING DEVICE AND PROGRAM

CROSS REFERENCE TO RELATED APPLICATIONS

This application is a U.S. National Phase Application under 35 U.S.C. 371 of International Application No. PCT/JP2020/036335, filed on Sep. 25, 2020, which claims priority to Japanese Patent Application No. 2020-070662, filed on Apr. 9, 2020. The entire disclosures of the above applications are expressly incorporated by reference herein.

BACKGROUND

Technical Field

The present invention relates to an information processing apparatus and a program.

Related Art

In recent years, services using the Internet have become diversified, and it has become possible to purchase products using not only personal computers but also smartphones, tablets, or other devices.

A purchaser who wishes to purchase a product typically select a product using a web browser or a specialized application. At this time, the purchaser often wishes to purchase the desired product at a lower price. Therefore, a search system providing product information acquired from a plurality of stores has been proposed (see Patent Application Publication No. 2002-108879).

By the way, since comparison of product information acquired from a plurality of stores is not a necessary process when a purchaser purchases a product, the purchaser may purchase a product without going through the process, whether intentionally or not. Even in such a case, if the purchaser learns that the same product was sold at a lower price or sold with additional value such as points after purchasing the product, the purchaser will be displeased.

In view of the above circumstances, the present invention provides an information processing apparatus and a program that enables a purchaser to compare provision conditions of a product such as selling price during a process of purchasing the product.

SUMMARY

According to an aspect of the present invention, provided is an information processing apparatus. The information processing apparatus comprises a reception unit, a prediction unit, a specification unit, and an information generation unit. The reception unit is configured to receive a character or a character string and input destination identification information. The input destination identification information is configured to identify input destination of the character or the character string. The prediction unit is configured to predict a word based on the character or the character string received by the reception unit according to the input destination identification information received by the reception unit. The specification unit is configured to specify a product or service associated with the word. The information generation unit is configured to generate display information displaying name of the product or the service as a candidate for an input character string.

According to an aspect of the invention, a purchaser of a product can easily acquire information such as selling price of the product during a process of purchasing the product, enabling the purchaser to purchase the product on favorable terms.

DETAILED DESCRIPTION

Hereinafter, embodiments of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of a circuit, a circuitry, a processor, a memory, and the like. In other words, it is a circuit includes application specific integrated circuit (ASIC), programmable logic device (e.g., simple programmable logic device (SPLD), complex programmable logic device (CPLD), and field programmable gate array (FPGA)), and the like.

Configuration

Figure 1:
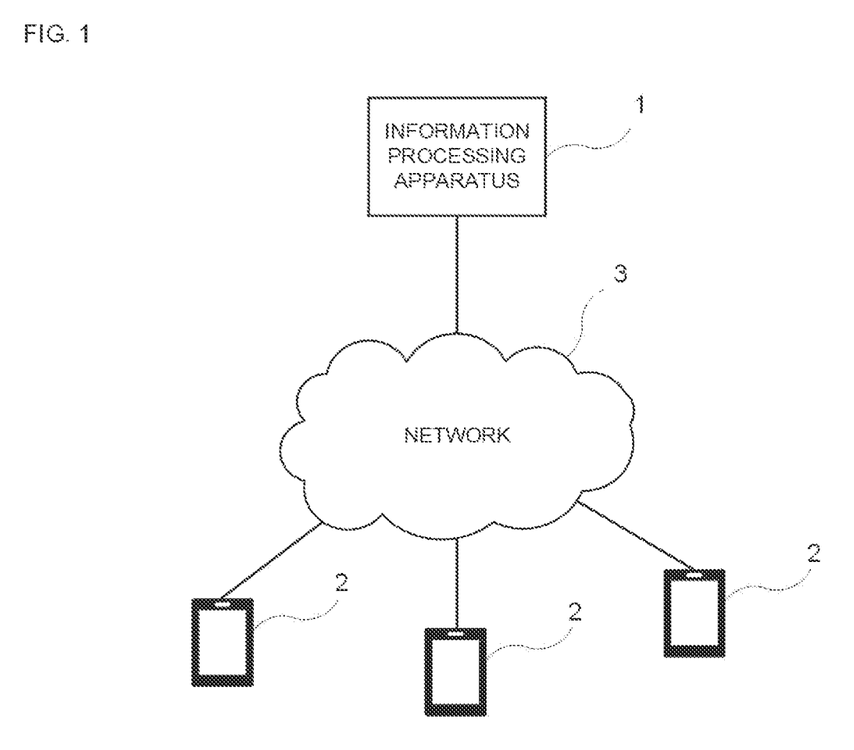
FIG. 1 is a diagram showing a connection configuration of an information processing apparatus 1 and an information processing apparatus 2 according to an embodiment of the present invention.

FIG. 1 is a diagram showing a connection configuration of an information processing apparatus 1 and an information processing apparatus 2 according to an embodiment of the present invention. As shown in FIG. 1, the information processing apparatus 1 is communicatively connected to each of information processing apparatus 2 via a network 3. The information processing apparatus 1 operates as a server, and the information processing apparatus 2 is a smartphone, a personal computer, or the like used by a product purchaser.

Figure 2:
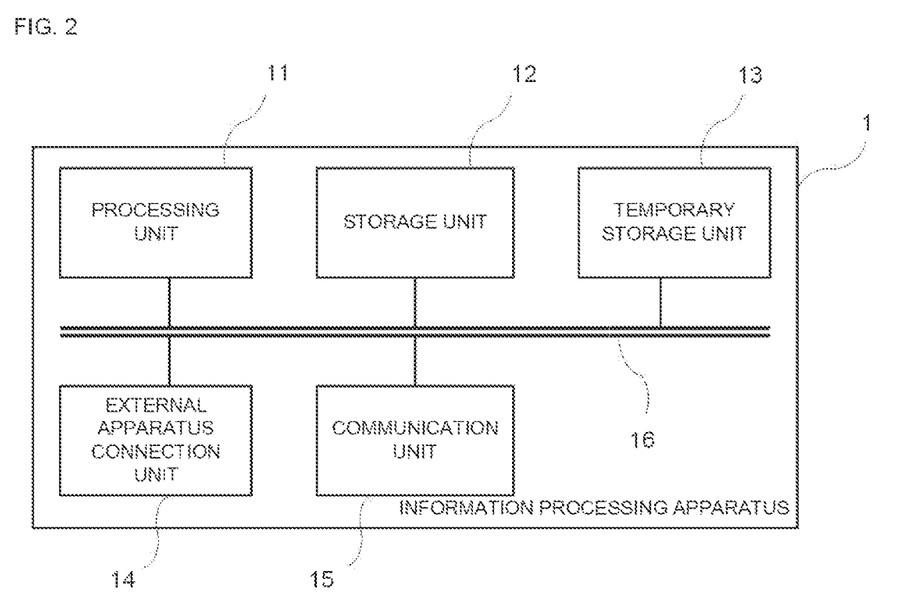
FIG. 2 is a diagram showing a configuration of the information processing apparatus 1.

FIG. 2 is a diagram showing a configuration of the information processing apparatus 1. As shown in FIG. 2, the information processing apparatus 1 comprises a processing unit 11, a storage unit 12, a temporary storage unit 13, an external apparatus connection unit 14, and a communication unit 15, and these components are electrically connected within the information processing apparatus 1 via a communication bus 16.

The processing unit 11 is realized by, for instance, a central processing unit (CPU), and operates according to a predetermined program stored in the storage unit 12 to realize various functions.

The storage unit 12 is a nonvolatile storage medium that stores various information. It can be realized by a storage device such as a hard disk drive (HDD) or a solid state drive (SSD). The storage unit 12 can be placed in another apparatus capable of communicating with the information processing apparatus 1.

The temporary storage unit 13 is a volatile storage medium. It can be realized by a memory such as a random access memory (RAM), and temporarily stores necessary information (arguments, sequences, etc.) for the processing unit 11 to operate.

The external apparatus connection unit 14 is a connection unit conforming to a standard such as a universal serial bus (USB) or a high-definition multimedia interface (HDMI), and can connect an input apparatus such as a keyboard or a display apparatus such as a monitor.

The communication unit 15 is, for example, a communication means conforming to a standard such as a local area network (LAN), and realizes communication between the information processing apparatus 1 and a network 3 such as a local area network or the Internet via the network.

A computer, a personal computer, or the like for general-purpose server can be used as the information processing apparatus 1, and the information processing apparatus 1 can be configured by using a plurality of computers.

Figure 3:
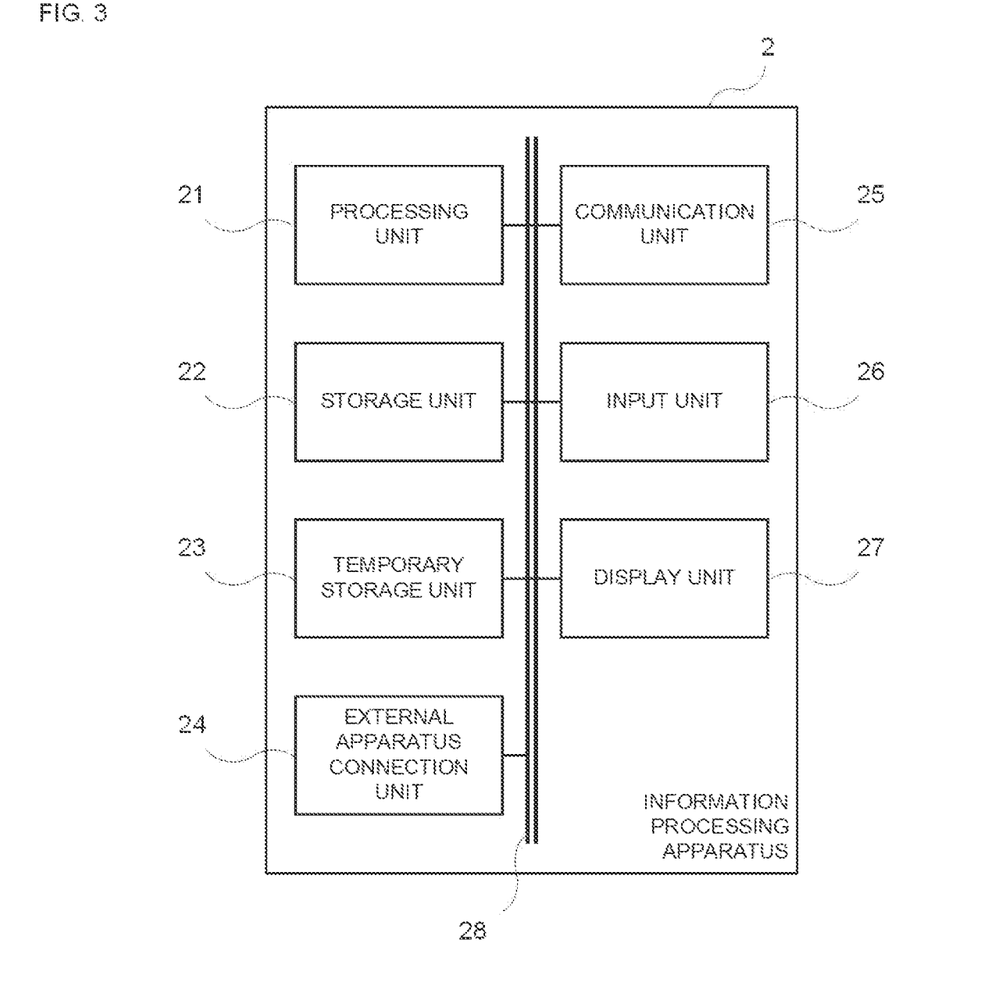
FIG. 3 is a diagram showing a configuration of the information processing apparatus 2.

FIG. 3 is a diagram showing a configuration of the information processing apparatus 2. As shown in FIG. 3, the information processing apparatus 2 comprises a processing unit 21, a storage unit 22, a temporary storage unit 23, an external apparatus connection unit 24, a communication unit 25, an input unit 26, and a display unit 27, and these components are electrically connected within the information processing apparatus 2 via a communication bus 28.

The processing unit 21 is realized by, for instance, a central processing unit, and operates according to a predetermined program stored in the storage unit 22 to realize various functions.

The storage unit 22 is a nonvolatile storage medium that stores various information.

The temporary storage unit 23 is a volatile storage medium. It can be realized by a memory such as a random access memory (RAM), and temporarily stores necessary information (arguments, sequences, etc.) for the processing unit 21 to operate.

The external apparatus connection unit 24 is a connection unit conforming to a standard such as a universal serial bus (USB) or a high-definition multimedia interface (HDMI), and can connect an input apparatus such as a keyboard or a display apparatus such as a monitor.

The communication unit 25 is, for example, a communication means conforming to a standard such as a local area network (LAN), and realizes communication between the information processing apparatus 1 and a network such as a local area network or the Internet via the network. Further, the communication unit 25 also includes communication means capable of communicating via a portable phone network.

The input unit 26 receives operation input. The display unit 27 displays information or the like on a screen. The input unit 26 and the display unit 27 may be integrated as a touch panel.

A smartphone, a tablet terminal, or the like general-purpose can be used as the information processing apparatus 2.

2. First Embodiment 2-1. Functions of Information Processing Apparatus 100 and Information Processing Apparatus 200

Figure 4:
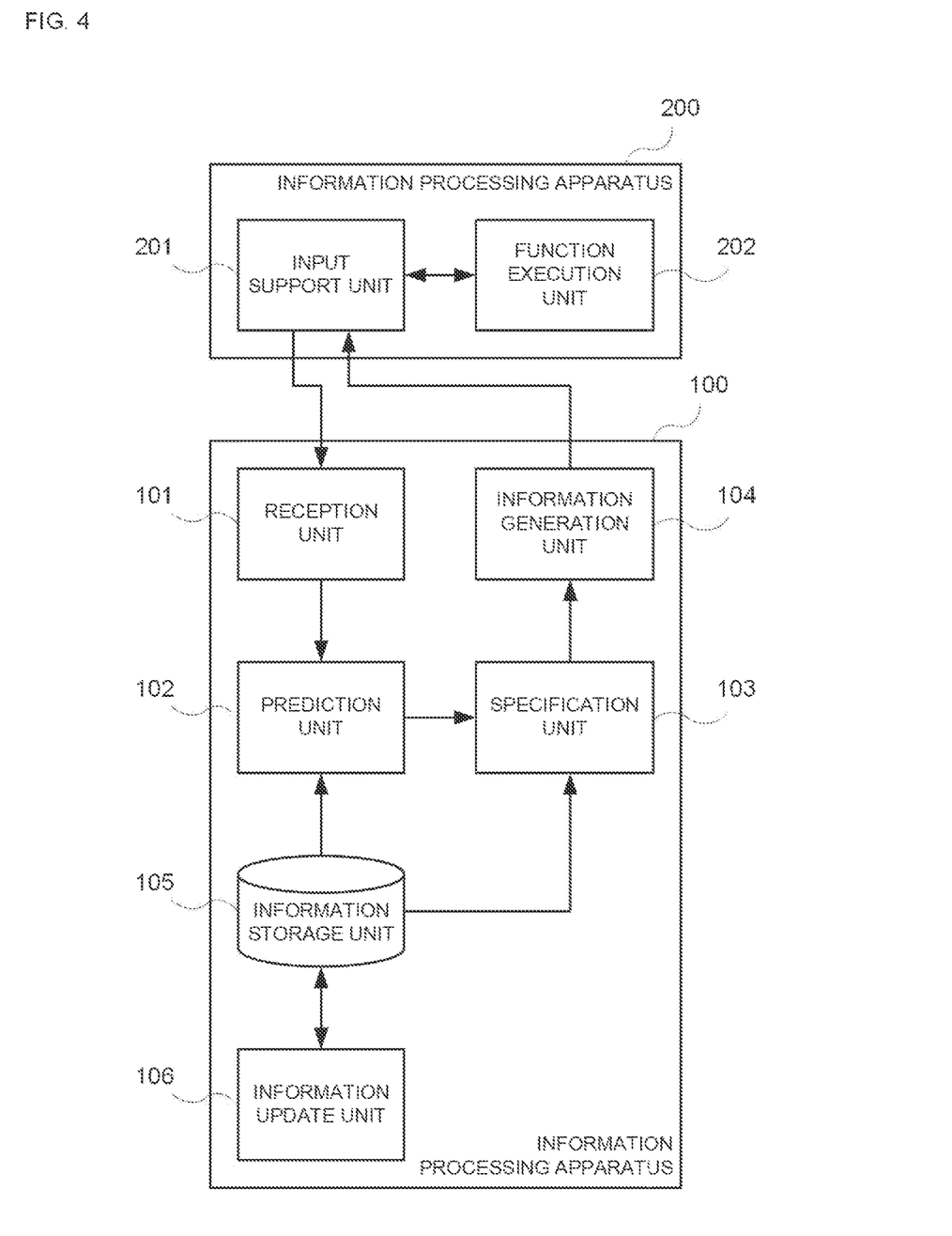
FIG. 4 is a block diagram showing functional configurations of an information processing apparatus 100 and an information processing apparatus 200.

First, functions of an information processing apparatus 100 and an information processing apparatus 200 will be described. The information processing apparatus 100 is realized by allowing a program to operate in the information processing apparatus 1, and the information processing apparatus 200 is realized by allowing a program to operate in the information processing apparatus 2.

FIG. 4 is a block diagram showing functional configurations of the information processing apparatus 100 and the information processing apparatus 200. As shown in FIG. 4, the information processing apparatus 100 comprises a reception unit 101, a prediction unit 102, a specification unit 103, an information generation unit 104, an information storage unit 105, and an information update unit 106. The information processing apparatus 200 comprises an input support unit 201 and a function execution unit 202.

The reception unit 101 is configured to receive a character or a character string. The character or the character string is input from the input support unit 201, and the input support unit 201 is, for example, a software keyboard. Further, the reception unit 101 is configured to receive input destination identification information that is configured to identify input destination of the character or the character string. The input destination of the character or the character string is the function execution unit 202, and the function execution unit 202 is realized by an application software executed by the information processing apparatus 200, for instance, a function for purchasing a product.

The prediction unit 102 is configured to predict a word based on the character or the character string received by the reception unit 101 according to the input destination identification information received by the reception unit 101. Further, the input destination identification information is configured to identify application software for purchasing a product or service. Thereby, the prediction unit 102 is configured to predict a provider of the application software according to the input destination identification information. Specifically, the prediction unit 102 predicts the words including the received character or character string by using a statistical method or the like. Moreover, although the prediction unit 102 predicts the provider of the application software according to the input destination identification information, if the provider cannot be predicted, or if the input destination identified by the input destination identification information is an input destination text box that handles privacy, the prediction itself may not be performed.

The specification unit 103 is configured to specify a product or service associated with the word predicted by the prediction unit 102. In this case, the specification unit 103 may specify a product or service provided by a provider other than the provider predicted by the prediction unit 102. Specifically, the specification unit 103 specifies a product with a product name that matches or partially matches the word predicted by the prediction unit 102, a product similar to the product, or a related product from a product or service from a provider other than the provider predicted by the prediction unit 102.

The information generation unit 104 is configured to generate display information displaying name of the product or the service as a candidate for an input string. The information generation unit 104 may be configured to generate the display information when the input destination identification information is a text box configured by the application software for product purchase. The display information may include a provision condition of the product or the service in the display information, e.g., provision price of the product or the service. Other display information generated by the information generation unit 104 may include an activation instruction object activating an application software for purchasing a displayed product or service, or may include a purchase instruction object instructing purchase of a displayed product or service. When including the activation instruction object, if the corresponding application software is not installed on the information processing apparatus 200, the corresponding application software may be installed, or a web browser may be activated with an address of corresponding website as an argument.

The information storage unit 105 is configured to store a dictionary required for the prediction unit 102 to perform a prediction, or product information including price, seller, or the like of the product specified by the specification unit 103.

The information update unit 106 is configured to acquire product information periodically or in accordance with a notification from a product seller, etc., and update the product information stored in the information storage unit 105.

To realize such an information processing apparatus 100, a program that allows the information processing apparatus 1, which is a computer, to operate as the information processing apparatus 100 is configured to allow the information processing apparatus 1 to operate as the information processing apparatus 100 comprising the reception unit 101, the prediction unit 102, the specification unit 103, and the information generation unit 104. The reception unit 101 is configured to receive a character or a character string and input destination identification information. Here, the input destination identification information is configured to identify input destination of the character or the character string. The prediction unit 102 is configured to predict a word based on the character or the character string received by the reception unit 101 according to the input destination identification information received by the reception unit 101. The specification unit 103 is configured to specify a product or service associated with the word. The information generation unit 104 is configured to generate display information displaying name of the product or the service as a candidate for an input character string.

2-2. Operation of Information Processing Apparatus 100

Figure 5:
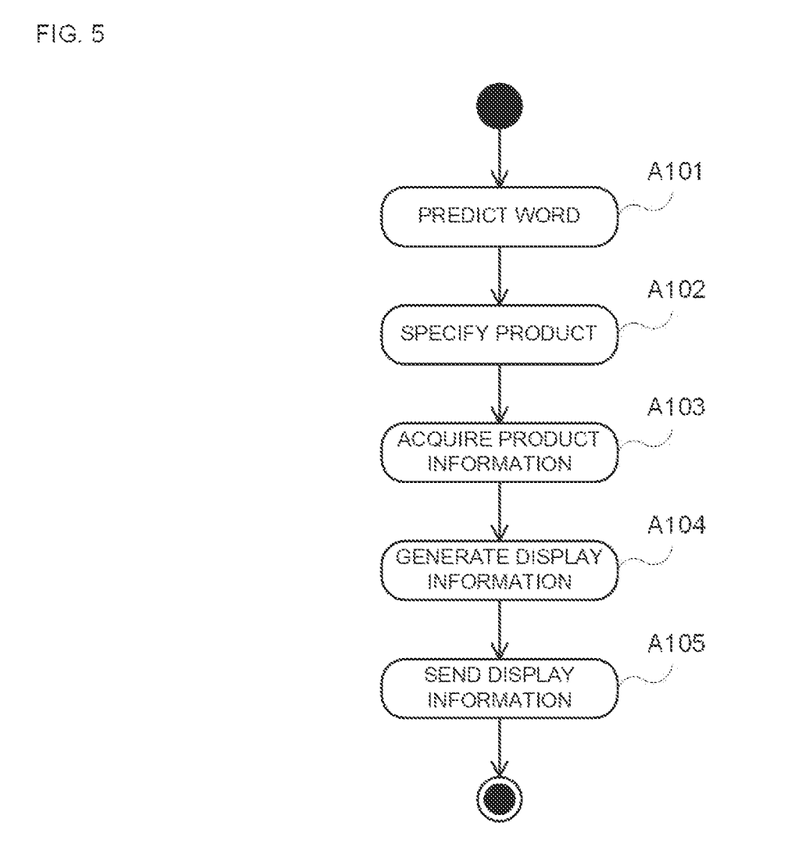
FIG. 5 is an activity diagram showing an operation flow of the information processing apparatus 100.

Next, operation of the information processing apparatus 100 will be described. FIG. 5 is an activity diagram showing an operation flow of the information processing apparatus 100. FIGS. 6 to 9 are diagrams showing examples of display screen displayed on the information processing apparatus 200, respectively.

Figure 6:
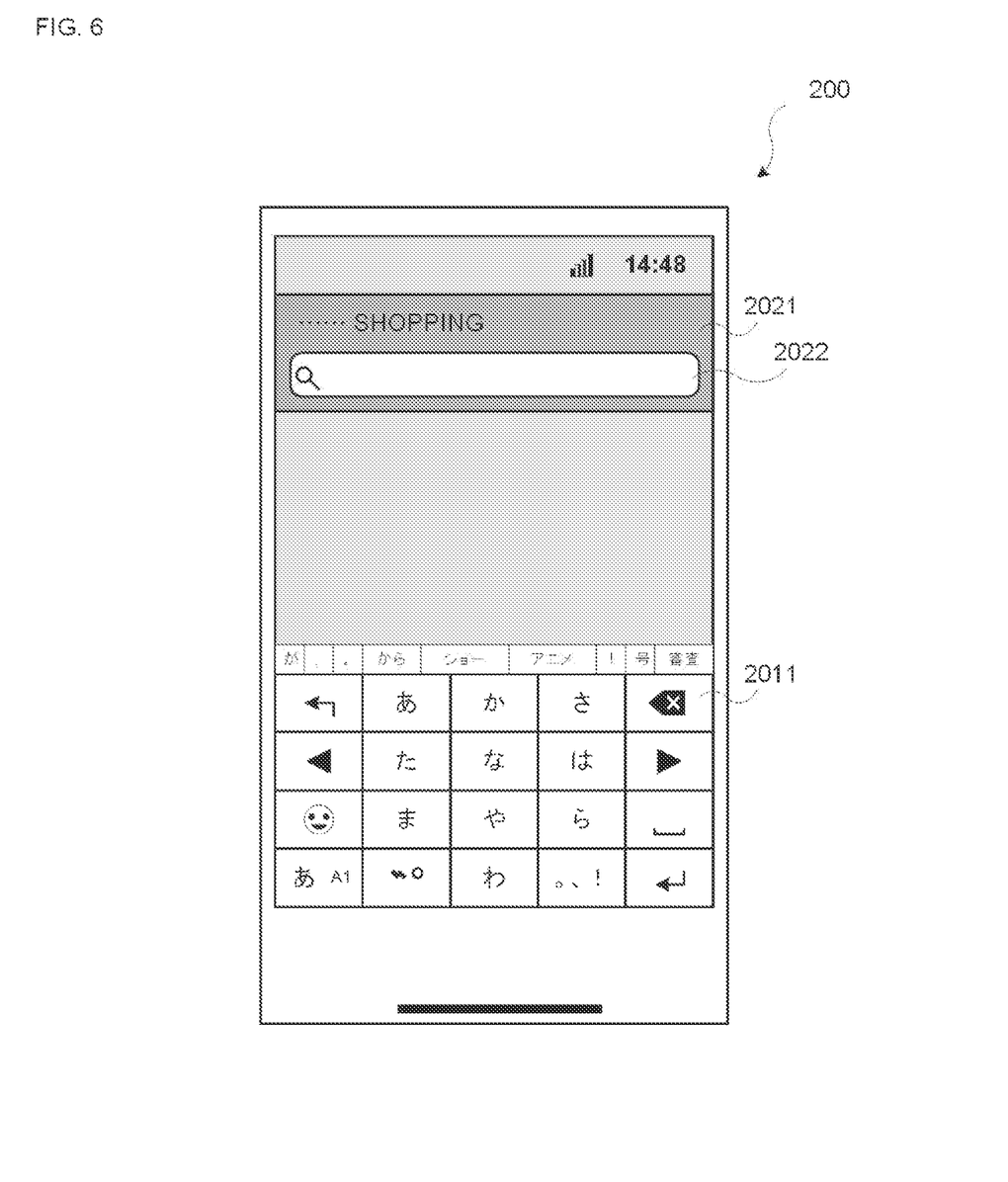
FIG. 6 is a diagram showing an example of a display screen displayed on the information processing apparatus 200.

First, as a premise, it is assumed that an operator (product purchaser) of the information processing apparatus 200 activates an application software for purchasing a product and allows an application screen 2021 to display on the information processing apparatus 200. On the application screen 2021, a text box 2022 for inputting a character or a character string when searching for a product is displayed. When the operator selects the text box 2022, a software keyboard 2011 is displayed on the information processing apparatus 200. The application screen 2021 corresponds to the function execution unit 202, and the software keyboard 2011 corresponds to the input support unit 201.

When the operator inputs a character using the software keyboard 2011, selects a character string displayed as a candidate, or pastes a character or character string being copied, the input support unit 201 notifies the reception unit 101 of the character or the character string and the input destination identification information. When the reception unit 101 receives the notification from the input support unit 201, the information processing apparatus 100 starts operation, the prediction unit 102 predicts a word based on the received character or character string, and the prediction unit 102 predicts a provider based on the received input destination identification information (A101). Then, based on the word predicted by the prediction unit 102, the specification unit 103 specifies a product from a group of products provided by a provider different from the predicted provider (A102). Once the specification unit 103 specifies the product, the information generation unit 104 acquires product information from the information storage unit 105 (A103), generates display information based on the acquired product information (A104), and sends the generated display information to the information processing apparatus 200 (A105). If the specification unit 103 is unable to specify the product, for instance, if the number of target products is enormous or if the target product does not exist, the information generation unit 104 generates display information that does not include product information.

Figure 7:
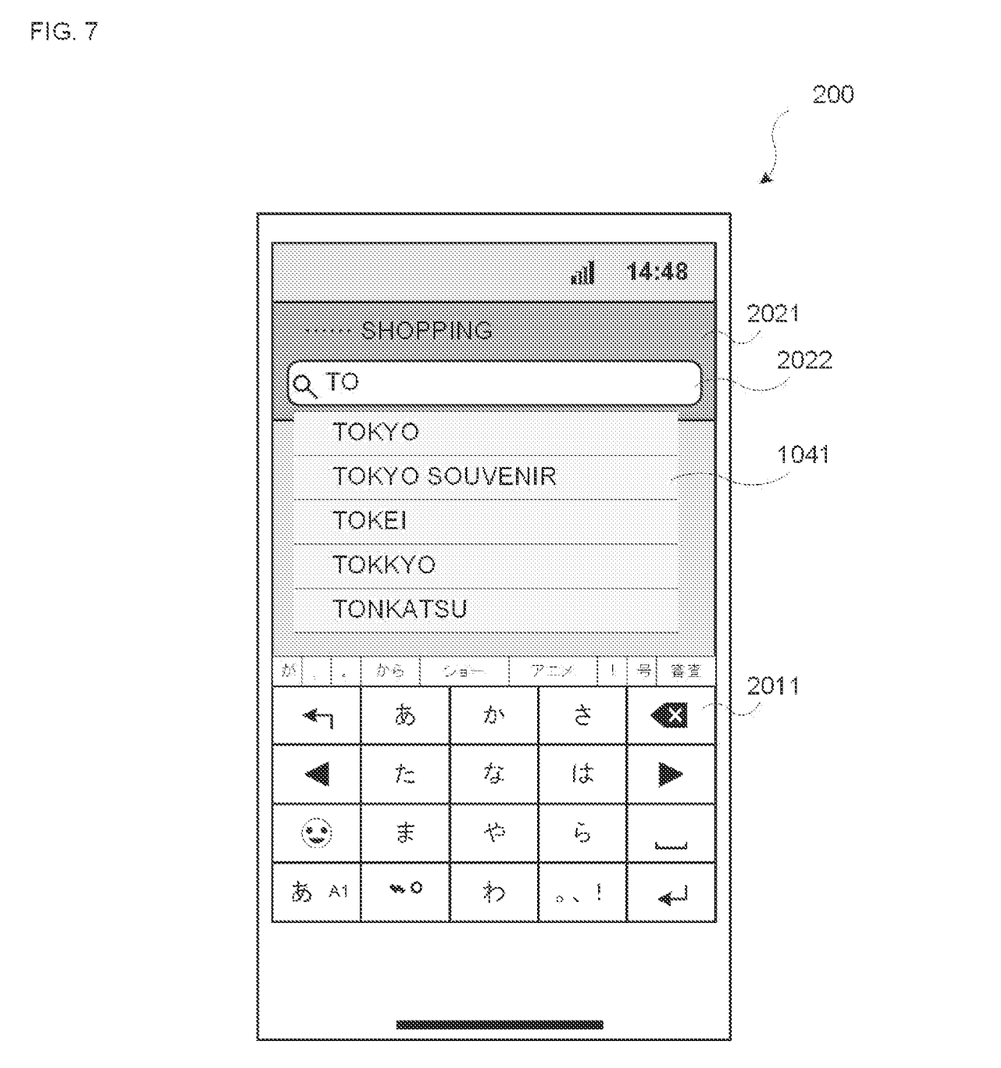
FIG. 7 is a diagram showing an example of a display screen displayed on the information processing apparatus 200.

The information processing apparatus 100 performs these processes each time it receives a character or character string and input destination identification information. For example, as shown in FIG. 7, when character "To (And in Japanese)" is input to the text box 2022, the prediction unit 102 predicts "Tokyo (Tokyo in Japanese)", "Tokyo miyage (Tokyo souvenir in Japanese)", "Tokei (Clock in Japanese)", "Tokkyo (Patent in Japanese)", "Tonkatsu (Pork cutlet in Japanese)", or the like. However, since the specification unit 103 cannot specify the product, the information generation unit 104 generates display information that does not include product information and sends to the information processing apparatus 200. The information processing apparatus 200 displays the display information as a prediction result 1041 as an input candidate to the text box 2022. If the display information is enormous or does not exist, the input candidate to the text box 2022 may not be displayed.

Figure 8:
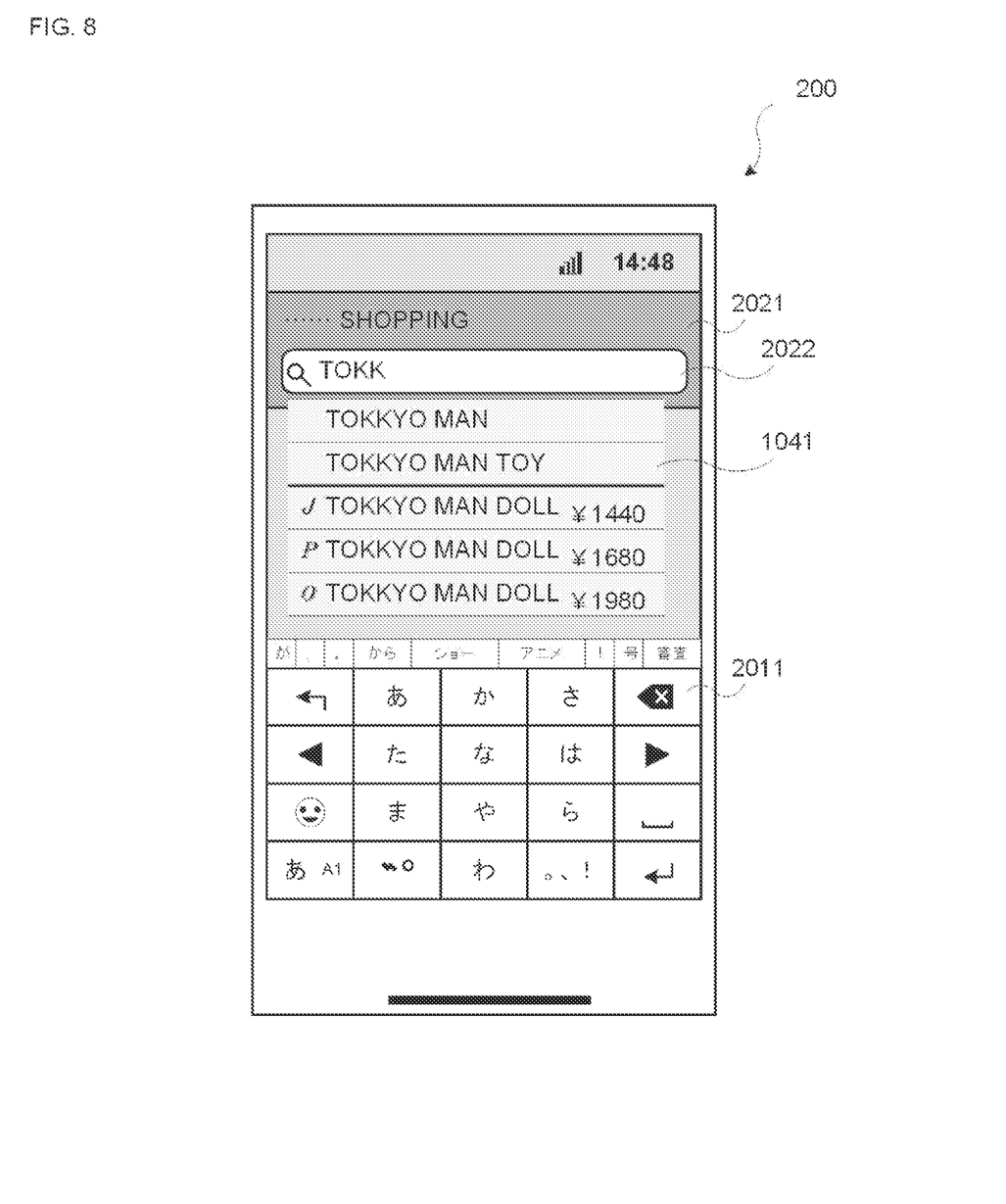
FIG. 8 is a diagram showing an example of a display screen displayed on the information processing apparatus 200.

Subsequently, as shown in FIG. 8, when a character "tsu (or kk, Japanese character)" is input to the text box 2022, the prediction unit 102 predicts "Tokkyo man (Patent man in Japanese)", "Tokkyo man omochia (Patent man toy in Japanese)", or the like, and the specification unit 103 specifies "Tokkyo man ningyo (Patent man doll in Japanese)" as a product from a group of products provided by a provider other than the provider of the application screen 2021. The information generation unit 104 generates display information including the product name "Tokkyo man ningyo" and product information such as its price along with an icon of seller of the Patent man doll, and sends to the information processing apparatus 200. The information processing apparatus 200 displays the displayed information as the prediction result 1041 as a proposal candidate for the character or character string input to the text box 2022.

Figure 9:
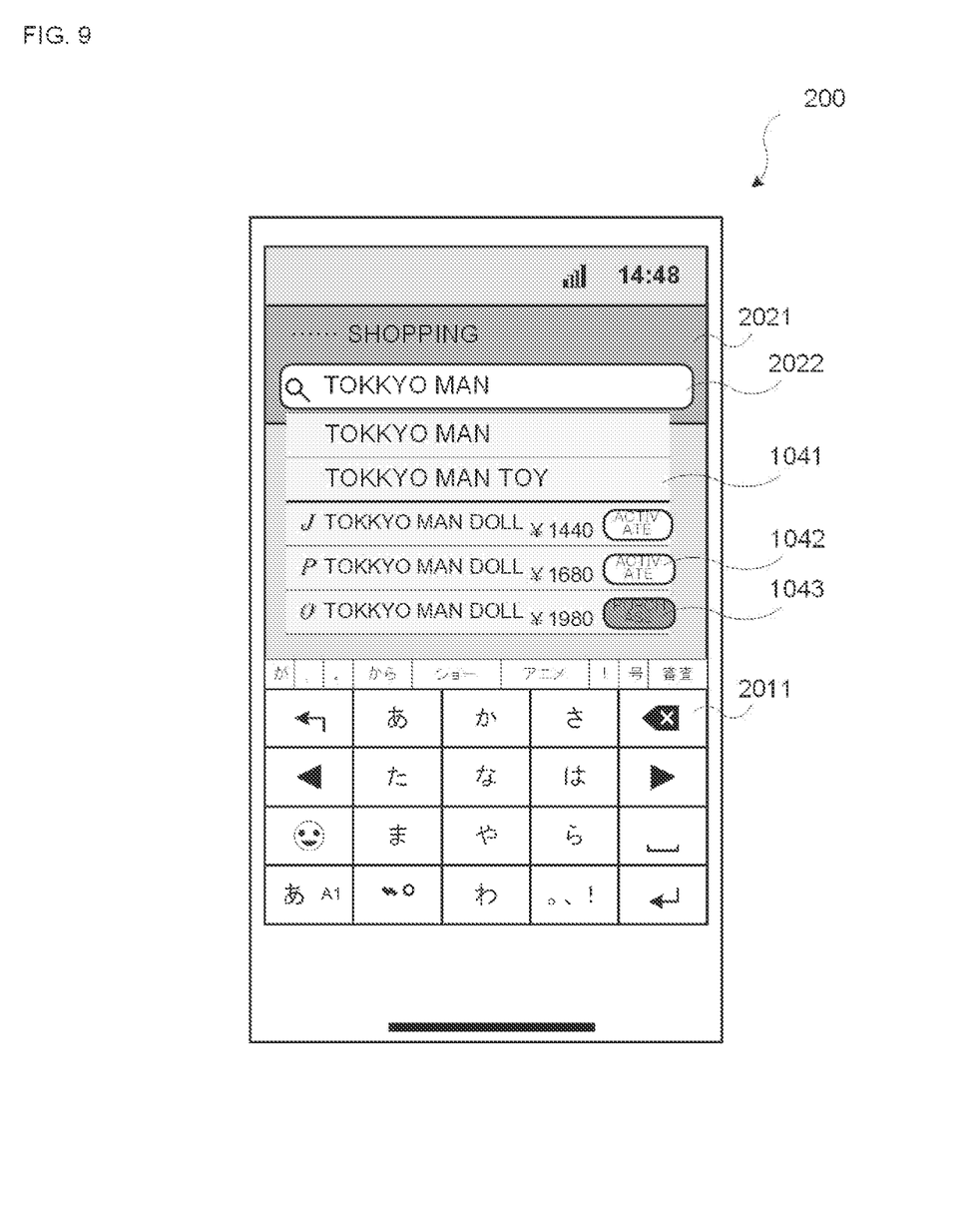
FIG. 9 is a diagram showing an example of a display screen displayed on the information processing apparatus 200.

As shown in FIG. 9, the display information generated by the information generation unit 104 may display an activation button 1042, which is an object for activating an application software to purchase a corresponding product, and a purchase button 1043, which is an object for instructing purchase of the corresponding product.

Although the case in which an application for purchasing a product is used as the input destination has been described here, when an application software such as a mailer is used as the input destination, the information processing apparatus 100 is notified of this fact and it is possible to perform prediction that does not include product information.

3. Second Embodiment

An information processing apparatus 210 described in the second embodiment performs the processing executed by the information processing apparatus 100 in the first embodiment.

First, function of the information processing apparatus 210 will be described. The information processing apparatus 210 is realized by allowing a program to operate in the information processing apparatus 2.

Figure 10:
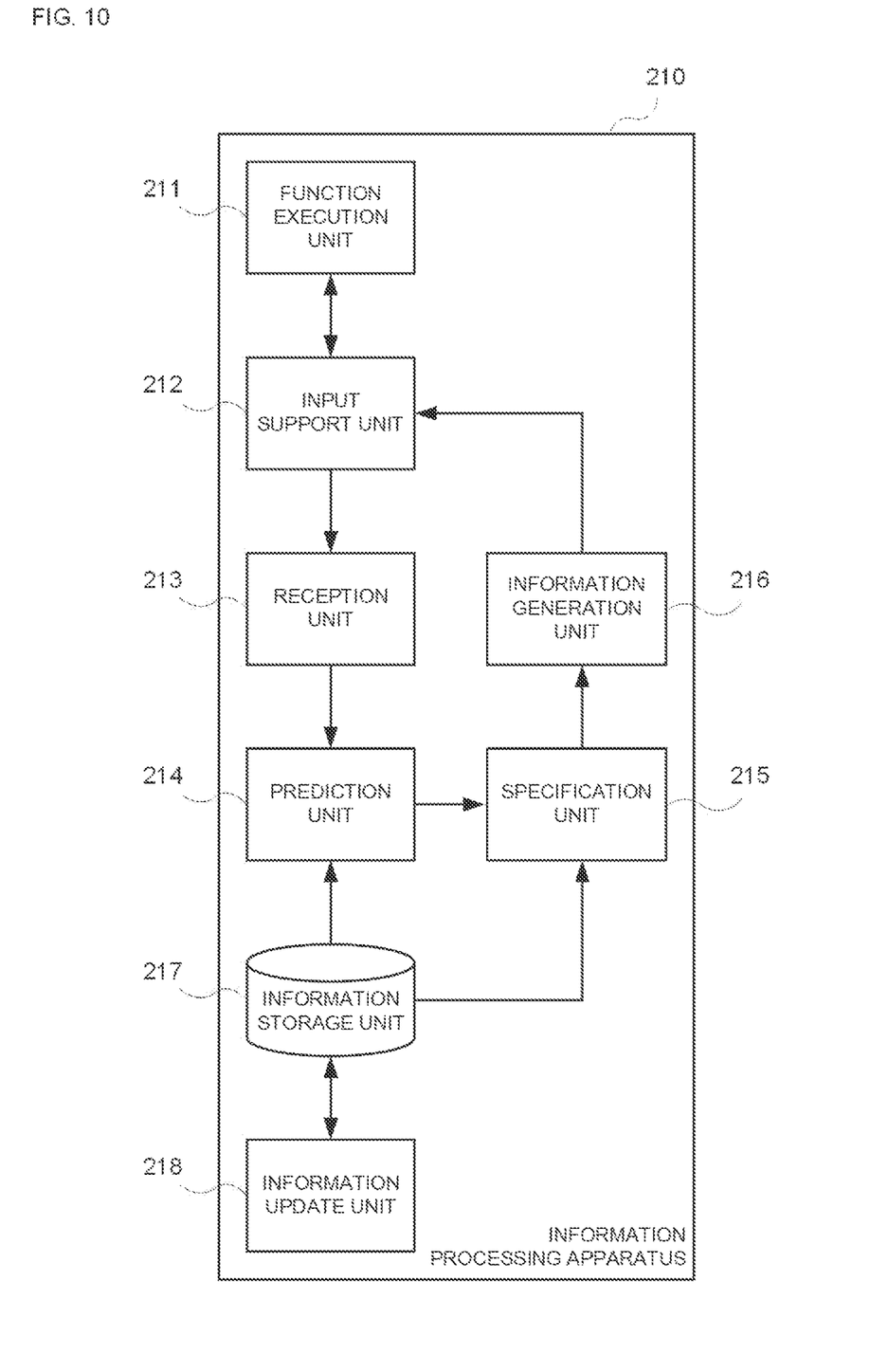
FIG. 10 is a block diagram showing a functional configuration of an information processing apparatus 210.

FIG. 10 is a block diagram showing a functional configuration of the information processing apparatus 210. As shown in the figure, the information processing apparatus 210 comprises a function execution unit 211, an input support unit 212, a reception unit 213, a prediction unit 214, a specification unit 215, an information generation unit 216, an information storage unit 217, and an information update unit 218.

The function execution unit 211, the input support unit 212, the reception unit 213, the prediction unit 214, the specification unit 215, the information generation unit 216, the information storage unit 217, and the information update unit 218 are correspond to the function execution unit 202, the input support unit 201, the reception unit 101, the prediction unit 102, the specification unit 103, the information generation unit 104, the information storage unit 105, and the information update unit 106 described in the first embodiment, respectively.

Since the operation of each unit of the information processing apparatus 210 is the same as the operation of the information processing apparatus 100 and the information processing apparatus 200 described in the first embodiment, detailed description thereof will be omitted.

4. Other

The present invention may be provided in each of the following aspects.

The information processing apparatus, wherein: the information generation unit includes a provision condition of the product or the service in the display information.

The information processing apparatus, wherein: the provision condition is a provision price of the product or the service.

The information processing apparatus, wherein: the input destination identification information is configured to identify application software for purchase of a product or service, the prediction unit is configured to predict a provider of the application software according to the input destination identification information, and the specification unit is configured to specify a product or service provided by a provider other than the provider predicted by the prediction unit.

The information processing apparatus, wherein: the display information includes an activation instruction object activating an application software for purchasing a displayed product or service.

The information processing apparatus, wherein: the display information includes a purchase instruction object instructing purchase of a displayed product or service.

A program that allows a computer to operate as an information processing apparatus,
wherein the information processing apparatus comprising: a reception unit configured to receive a character or a character string and input destination identification information, wherein the input destination identification information is configured to identify input destination of the character or the character string; a prediction unit configured to predict a word based on the character or the character string received by the reception unit according to the input destination identification information received by the reception unit; a specification unit configured to specify a product or service associated with the word; and an information generation unit configured to generate display information displaying name of the product or the service as a candidate for an input character string.

Of course, the above aspects are not intended to limit the present invention.

Furthermore, it may also be provided as a non-transitory computer readable medium storing the program.

What is claimed is:

1. An information processing apparatus, comprising:
a memory configured to store a program; and
a processor configured to execute the program so as to,
receive a character or a character string and input destination identification information, wherein the input destination identification information is configured to identify input destination of the character or the character string and is configured to identify application software for purchase of a product or service;
predict a word based on the character or the character string received by the processor according to the input destination identification information received by the processor and predict a provider of the application software according to the input destination identification information;
specify a product or service related to the word and specify a product or service provided by another provider other than the provider predicted by the processor; and
generate display information displaying name of the product or the service as a candidate for an input character string.

2. The information processing apparatus according to claim 1, wherein:

the processor is configured to include a provision condition of the product or the service in the display information.

3. The information processing apparatus according to claim 2, wherein:

the provision condition is a provision price of the product or the service.

4. The information processing apparatus according to claim 1, wherein:

the display information includes an activation instruction object activating an application software for purchasing a displayed product or service.

5. The information processing apparatus according to claim 1, wherein:

the display information includes a purchase instruction object instructing purchase of a displayed product or service.

6. A non-transitory computer readable medium storing a program for causing a computer to execute a process by a processor so as to perform the steps of:

receiving a character or a character string and input destination identification information, wherein the input destination identification information is configured to identify input destination of the character or the character string and is configured to identify application software for purchase of a product of service;

predicting a word based on the character or the character string received by the processor according to the input destination identification information received by the processor and predicting a provider of the application software according to the input destination identification information;

specifying a product or service associated with the word and specifying a product or service provided by another provider other than the provider predicted by the processor; and generating display information displaying name of the product or the service as a candidate for an input character string.

7. The non-transitory computer readable medium according to claim 6, wherein:

the processor is configured to include a provision condition of the product or the service in the display information.

8. The non-transitory computer readable medium according to claim 7, wherein:

the provision condition is a provision price of the product or the service.

9. The non-transitory computer readable medium according to claim 6, wherein:

the display information includes an activation instruction object activating an application software for purchasing a displayed product or service.

10. The non-transitory computer readable medium according to claim 6, wherein:

the display information includes a purchase instruction object instructing purchase of a displayed product or service.

* * * * *